United States Patent Office 3,632,849
Patented Jan. 4, 1972

3,632,849
PROCESS FOR THE PREPARATION OF TRANS-POLYPENTENAMERS
Gottfried Pampus, Leverkusen, and Josef Witte, Cologne-Stammheim, Germany, assignors to Farbenfabriken Bayer Aktiengesellschaft, Leverkusen, Germany
No Drawing. Filed Mar. 19, 1969, Ser. No. 808,693
Claims priority, application Germany, Apr. 6, 1968,
P 17 70 143.8
Int. Cl. C08f 7/02
U.S. Cl. 260—93.1
10 Claims

ABSTRACT OF THE DISCLOSURE

Method for producing trans-polypentenamer from cyclopentene by means of a catalyst comprising:
(a) A tungsten salt
(b) An organic epoxide
(c) An organo-aluminium compound.

---

The polymerisation of cyclopentenes using organo-metallic mixed catalysts based on organic aluminium compounds and tungsten salts is known. This polymerisation results in ring opening and the formation of linear unsaturated hydrocarbons in which the carbon-carbon double bonds are substantially in the trans configuration. A process for bulk polymerisation of cyclopentene with ring opening and trans-polypentenamer formation is described in British patent specification 1,010,860. This process has, however, serious disadvantages which make it difficult to carry it out on a technical scale. Bulk polymerisation produces reaction mixtures which are so viscous that it is impossible to control the temperature during the polymerisation. Furthermore, polymerisation can only be carried out to a conversion, of 20 to 50 percent, if a polymer which is not cross-linked and which can be worked up is to be obtained. At higher conversion insoluble cross-linked products which are of no technical interest are obtained. Moreover, as will be seen from the examples in British patent specification 1,010,860, very high quantities of catalysts are used, and long reaction times are required.

British patent specification 1,062,367 describes a process for the preparation of polyalkenamers in which the catalysts used are, inter alia, mixtures of a tungsten salt (e.g. WCl$_6$), a compound which contains an oxygen-oxygen bond or an oxygen-hydrogen bond, and an organic aluminium compound. This process is preferably carried out in the absence of inert diluents, and temperature control therefore becomes impossible owing to the extremely high viscosities of the reaction mixture. In this process, only moderate yields of 30 to 50% were obtained with relatively high catalyst concentrations although in shorter reaction times.

Furthermore, in these processes considerable technical difficulties are involved in short stopping the polymerisation owing to the high viscosity of the reaction mixture. The removal of the catalyst residues and the uniform distribution of the stabiliser in the polymer are very difficult when the process is carried out on a large industrial scale. If the processes described in the above-mentioned patents are carried out in the presence of inert solvents, e.g. aliphatic or aromatic hydrocarbons, the conversion of cyclopentene to polypentenamers is even less so that the process becomes technically useless.

It is an object of this invention to provide an improved process for producing polypentenamer. Another object is a catalyst for carrying out this process.

A process for the preparation of trans-polypentenamers has now been found in which a solution of cyclopentene in inert aliphatic, cycloaliphatic or aromatic hydrocarbons is contacted with an organometallic mixed catalyst of (a) a tungsten salt, (b) an epoxide and (c) an organic aluminium compound the molar ratio of a:b:c being 1:0.3 to 10:0.8–15.

Suitable solvent for use in the process of the invention are aliphatic hydrocarbons such as butane, pentane, hexane, iso-octane or cycloaliphatic compounds such as cyclohexane or aromatic compounds such as benzene, toluene or xylene. 5 to 50% solutions of cyclopentene in these solvents may be used for the process. Monomer concentrations of 10 to 30% are preferably employed.

The following are examples of compounds which may be used as catalyst components:

(a) WCl$_6$, WBr$_5$, WCl$_4$O;
(b) Epoxides of the general formula

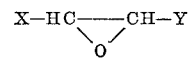

X is a hydrogen atom, or an alkyl, aryl or aralkyl group,
Y is a hydrogen atom, an alkyl, aryl or aralkyl group, or a group of the formula —CH$_2$Hal (Hal=Cl, Br, I) —CH$_2$—O—R (R is an alkyl or aryl group) H,
X and Y may be substituted, e.g. by alkyl groups (methyl) or halogen atoms (chlorine).

With reference to X and Y alkyl is preferably alkyl having 1–6 carbon atoms. Aryl is preferably phenyl, naphthyl, biphenyl. Aralkyl is preferably benzyl.

Preferred epoxides are lower alkylene epoxides as ethylene oxide, propylene oxide, butylene oxide and epichlorohydroxine as well as phenoxy-propylene oxide.

(c) Aluminium trialkyl, e.g. (Al(C$_2$H$_5$)$_3$, Al(C$_8$H$_{17}$)$_3$, Al(iso-C$_4$H$_9$)$_3$; aluminium halogen alkyl, e.g.

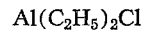

Al(C$_2$H$_5$)$_2$Br, Al(C$_2$H$_5$)Cl$_2$; and aluminium alkoxyalkyls, e.g. Al(C$_2$H$_5$)$_2$OC$_2$H$_5$.

The catalyst components may be used in the following molar ratios: a:b:c=1:0.3 to 10:0.8 to 15. The amount of catalyst used is 0.1 to 4 mmol, preferably 0.3 to 2 mmol of tungsten salt per 100 g. of monomer.

In a preferred method for carrying out the process, the tungsten salt is first added to the monomer solution, followed by the epoxide and lastly by the organic aluminium compound.

The temperature during the preparation of the catalyst may be between —60° and +60° C. and is preferably between —20° and +20 C.

Polymerisation starts immediately on addition of the organic aluminium compound. The polymerisation temperature may be between —60 and +60° C., preferably between —20° and +30° C. The polymerisation time is 1 to 5 hours. Conversions of cyclopentene to the trans-polypentenamer of 80 to 90% and more are then obtained. No gel formation occurs even at such high conversion rates.

The molecular weight of the polymers can be adjusted by suitable choice of the catalyst composition (ratio of the components) and of the sequence in which the components are added.

When the desired degree of conversion has been achieved, polymerisation is stopped by the addition of alcohols, carboxylic acids and/or amines. One of the usual products, e.g. phenyl-β-naphthylamine, 2,6-di-tertiary-butyl-4-methyl phenol or 2,2'-di-hydroxy-3,3'-di-tertiary-butyl-5,5'-dimethyl-diphenylmethane is added to the polymer solution as stabiliser and age resistor in quantities of 0.23%.

The polymer can be isolated by precipitation with an alcohol such as methanol, ethanol or isopropanel. On a technical scale, the polymer solution is preferably worked up by introducing it into hot water, unreacted monomer and an azeotropic mixture of the solvent and water distilling off in the process. The polymer is precipitated in the water as a crumb suspension and is separated from the water and dried either in a drying oven or on a platform drier or in a screw extruder.

The trans-polypentenamer is a rubbery polymer. It can be cross-linked using known vulcanisation systems and worked up on rubber processing machines.

EXAMPLE 1

800 g. of anhydrous benzene are introduced under a nitrogen atmosphere into a vessel equipped with a mechanical stirrer. 200 g. of cyclopentene and 1.58 g. (4 mmol) of tungsten hexachloride are then added at room temperature (23° C.) with the exclusion of oxygen and moisture. This solution of monomer and $WCl_6$ is cooled to —10° C., and 0.37 g. (4 mmol) of epichlorohydrin and 0.992 g. (5 mmol) of aluminium triisobutyl are then added with stirring and with the exclusion of oxygen and moisture. Polymerisation starts immediately on addition of the organic aluminum compound, as can be seen by the marked increase in the viscosity of the solution. The reaction temperature is controlled by suitable external cooling so that it slowly rises to 0° C. in the course of 4 hours. A solution of 1 g. of 2,2'-dihydroxy-3,3'-ditertiarybutyl-5,5'-dimethyl-diphenylmethane, 3 g. of ethanolamine and 20 g. of ethanol in 100 ml. of benzene is then added and the reaction mixture is stirred for 15 minutes. When the reaction in the polymerisation has been stopped and the solution stabilised, the product is precipitated with 3 litres of ethanol. The polymer is dried in vacuo at 50° C.

The yield is 155 g., i.e. 77.5% of the theoretical.

$(\eta)_{toluene,\ 25°\ c.} = 2.2$

94% of the double bonds have a trans-configuration as determined by the IR spectrum.

Calculation: $\text{Percent trans} = \dfrac{\frac{1}{10} \cdot E\ trans}{\frac{1}{10} \cdot E\ trans + \frac{1}{6} E\ cis} \cdot 100$ The double bond content, determined by titration with n/10 ICl solution corresponds exactly to the theoretical amount.

EXAMPLES 2 TO 8 (COMPARISON TESTS)

The following comparison tests corresponding to the prior art were carried out as described in Example 1:

| | Example Number | | | | | | |
|---|---|---|---|---|---|---|---|
| | 2 | 3 | 4 | 5 | 6 | 7 | 8 |
| Benzene, grams | 800 | 800 | 800 | 800 | 800 | 800 | 800 |
| Cyclopentene, grams | 200 | 200 | 200 | 200 | 200 | 200 | 200 |
| $WCl_6$, grams | 1.58 | 1.58 | 1.58 | 1.58 | 1.58 | 1.58 | 1.58 |
| Cooled, °C | −10 | −10 | −10 | −10 | −10 | −10 | −10 |
| $(CH_3)_3COOH$, grams | | 0.27 | | | | | |
| $(C_6H_5CO)_2O_2$, grams | | | 0.73 | | | | |
| $C_6H_5C(CH_3)_2OOH$, grams | | | | 0.46 | | | |
| $(CH_3)_2COOC(CH_3)_3$, grams | | | | | 0.44 | | |
| $C_2H_5OH$, grams | | | | | | 0.14 | 0.165 |
| $Al(iso-C_4H_9)_3$, grams | 0.992 | 0.992 | 0.992 | 0.992 | 0.992 | 0.992 | 1.07 |
| Polymerisation temperature, °C | −10-0 | −10-0 | −10-0 | −10-0 | −10-0 | −10-0 | −10-0 |
| Polymerisation time Yield, percent | 7 | 45 | 8 | 26 | 5 | 16 | 28 |
| $(\eta)$ (25° C., toluene) | 6.0 | 2.5 | 5.8 | | | | |

EXAMPLES 9 TO 13

The following examples were carried out as described in Example 1. The proportion of aluminium trialkyl to tungsten hexachloride was varied.

| | Example Number | | | | |
|---|---|---|---|---|---|
| | 9 | 10 | 11 | 12 | 13 |
| Benzene, grams | 800 | 800 | 800 | 800 | 800 |
| Cyclopentene, grams | 200 | 200 | 200 | 200 | 200 |
| $WCl_6$ [1] | | | | | |
| Cooled, °C | −10 | −10 | −10 | −10 | −10 |
| Epichlorohydrin [2] | | | | | |
| Al(iso-$C_4H_9$): | | | | | |
| (grams) | 0.712 | 0.791 | 0.992 | 1.07 | 1.29 |
| (mmol) | 3.6 | 4.0 | 5.0 | 5.4 | 6.5 |
| Polymerisation temperature, °C | −10-0 | −10-0 | −10-0 | −10-0 | −10-0 |
| Polymerisation time, hours | 4 | 4 | 4 | 4 | 4 |
| Yield, percent | 55 | 60 | 68 | 68 | 73 |
| $(\eta)$ toluene, 25° C | 2.7 | 2.0 | 2.11 | 1.87 | 1.78 |
| Percent trans double bond | 92.2 | 94.8 | 94.8 | 94.6 | 93.8 |

[1] 1.58 grams = 4 mmol.
[2] 0.37 grams = 4 mmol.

EXAMPLES 14 TO 20

The tungsten hexachloride is dissolved in 300 ml. of anhydrous toluene, and 70 g. of cyclopentene are then added. The substance which is to be tested as the co-catalyst is then added, the mixture is cooled to —5° C., and the aluminium alkyl compound is added. After 4 hours' polymerisation at —5° C., the reaction is stopped with a soluton of 0.5 g. of 2,2'-di-hydroxy-3,3'-di-tertiary-butyl-5,5'-dimethyldiphenylmethane and 2 g. of N-methyl-diethanolamine, and the polymer is precipitated with ethanol and dried in vacuo at 70° C.

| Example number | $WCl_6$, mmol | Compound added mmol | Aluminium compound, mmol | Yield, percent | Amount of trans C=C, percent |
|---|---|---|---|---|---|
| 14 | 1.0 | 0.9 t-butyl-hydroperoxide | 2.0 Al(isobutyl)$_3$ | 18 | 91.7 |
| 15 | 1.2 | 1.2-diethylether | 1.5 Al(isobutyl)$_3$ | 1 | |
| 16 | 1.2 | 1.2 THF | do | 1 | |
| 17 | 1.0 | 1.0 phenoxy-propylene oxide | 1.0 Al(isobutyl)$_3$ | 62 | 91.5 |
| 18 | 2.0 | 2.0 propylene oxide | 1.5 Al(isobutyl)$_3$ | 81 | 95.0 |
| 19 | 2.0 | 1.0 ethanol | 8.0 ethyl aluminium dichloride | 19 | 90.2 |
| 20 | 2.0 | 8.0 propylene oxide | do | 63 | 94.6 |

Examples 17, 18 and 20 show the distinct superiority of the co-catalysts according to the invention, of the epoxides over open and cyclic ethers (Examples 15 and 16) and over the prior art (Examples 14 and 19).

EXAMPLES 21 TO 24

The following examples were carried out as described in Example 1. The tungsten hexachloride/epoxide ratio was varied.

| | Example Number | | | |
|---|---|---|---|---|
| | 21 | 22 | 23 | 24 |
| Benzene, grams | 800 | 800 | 800 | 800 |
| Cyclopentene, grams | 200 | 200 | 200 | 200 |
| WCl$_6$ | (1) | (1) | (1) | (1) |
| Cooled to, °C | −5 | −5 | −5 | −5 |
| Epichlorohydrin: | | | | |
| (Grams) | 0.37 | 0.44 | 0.5 | 0.55 |
| (Mmol) | 4 | 4.8 | 5.4 | 6 |
| Al(i-C$_4$H$_9$)$_3$: | | | | |
| (Grams) | 1.07 | 1.07 | 1.07 | 1.07 |
| (Mmol) | 5.4 | 5.4 | 5.4 | 5.4 |
| Polymerisation temperature, °C | −5−+5 | −5−+5 | −5−+5 | −5−+5 |
| Polymerisation time (hours) | 4 | 4 | 4 | 4 |
| Yield, percent | 78 | 76 | 72 | 75 |
| η (in toluene at 25° C.) | 2.25 | 1.95 | 1.81 | 1.6 |
| Percent trans double bond | 95.6 | 94 | 94 | 93.9 |

[1] 1.58 grams=4 mmol.

EXAMPLES 25 TO 27

The following examples were carried out as described in Example 1. The total catalyst concentration was varied.

| | Example Number | | |
|---|---|---|---|
| | 25 | 26 | 27 |
| Benzene, grams | 800 | 800 | 800 |
| Cyclopentene, grams | 200 | 200 | 200 |
| WCl$_6$: | | | |
| (Grams) | 1.58 | 1.18 | 0.79 |
| (Mmol) | 4 | 3 | 2 |
| Cooled to, °C | −5 | −5 | −5 |
| Epichlorohydrin: | | | |
| (Grams) | 0.37 | 0.28 | 0.185 |
| (Mmol) | 4 | 3 | 2 |
| Al(i-C$_4$H$_9$)$_3$: | | | |
| (Grams) | 1.07 | 0.89 | 0.65 |
| (Mmol) | 5.4 | 4.5 | 3.3 |
| Polymerisation temperature, °C | −5−+5 | −5−+5 | −5−+5 |
| Polymerisation time (hours) | 4 | 4 | 4 |
| Yield, percent | 76 | 79 | 83 |
| η (in toluene at 25° C.) | 1.83 | 1.48 | 1.02 |
| Percent trans double bonds | 93.7 | 94.0 | 93.7 |

EXAMPLES 28 TO 34

Monomer solutions were prepared in each case from 500 ml. of anhydrous benzene and 100 g. of anhydrous cyclopentene under a nitrogen atmosphere, using vessels equipped with stirrers. The cyclopentene was contaminated with the following substances: 0.06% of cis-pentadiene-1,3; 0.24% of trans-pentadiene-1,3; 0.6% of 2-methylbutene-2; and 0.035% of isoprene.

1 millimol of WCl$_6$ was added to each of the monomer solutions at 0° C. and the reaction mixture was in each case stirred for 10 minutes to ensure complete solution. The cocatalyst was then added and the solution cooled to −5° C. The aluminium alkyl compound was then added. Polymerisation sets in at once, as can be seen by a rapid increase in the viscosity.

The polymerisations, which were carried out at temperatures between −5° and 0° C., were stopped after 4 hours by the addition of 0.5 g. of 2,2′-di-hydroxy-3,3′-ditertiary-butyl-5,5′-dimethyl-diphenylmethane and 2 g. of N-methyl-diethanolamine dissolved in 30 ml. of ethanol. The polymers were precipitated with ethanol, kneaded for a short time and dried in vacuo at 60° C. The results of the polymerisation experiments are summarised in the following table.

What is claimed is:
1. A process for producing trans-polypentenamers which comprises dissolving cyclopentene in an inert hydrocarbon solvent and contacting resulting solution with a catalytic amount of a catalyst comprising (a) tungsten hexachloride, tungsten pentabromide or tungsten oxytetrachloride, (b) an epoxide of the formula

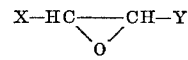

wherein X is hydrogen, alkyl having 1 to 6 carbon atoms, chloroalkyl having 1 to 6 carbon atoms, phenyl, chlorophenyl, methylphenyl, naphthyl, chloronaphthyl, methylnaphthyl, biphenyl, chlorobiphenyl, methylbiphenyl, benzyl, chlorobenzyl or methylbenzyl and Y is hydrogen, alkyl having 1 to 6 carbon atoms, halomethyl wherein halo is chlorine, bromine or iodine, phenyl, chlorophenyl, methylphenyl, naphthyl, chloronaphthyl, methylnaphthyl, biphenyl, chlorobiphenyl, methylbiphenyl, benzyl, chlorobenzyl or methylbenzyl and (c) aluminum trialkyl, aluminum halogen alkyl or aluminum alkoxyalkyl, the molar ratio of a:b:c being 1:0.3 to 10:0.8 to 15.

2. The process of claim 1 wherein (a) is tungsten hexachloride.

3. The process of claim 1 wherein X and Y are hydrogen or alkyl having 1 to 6 carbon atoms.

4. The process of claim 1 wherein (c) is aluminum trialkyl.

5. The process of claim 1 wherein the temperature is from −60 to 60° C.

6. The process of claim 1 wherein said hydrocarbon solvent is an aliphatic, cycloaliphatic or aromatic hydrocarbon.

7. A catalyst for producing trans-cyclopentenamer comprising (a) tungsten hexachloride, tungsten pentabromide or tungsten oxytetrachloride, (b) an epoxide of the formula

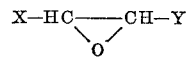

wherein X is hydrogen, alkyl having 1 to 6 carbon atoms, chloroalkyl having 1 to 6 carbon atoms, phenyl, chlorophenyl, methylphenyl, naphthyl, chloronaphthyl, methylnaphthyl, biphenyl, chlorobiphenyl, methylbiphenyl, benzyl, chlorobenzyl or methylbenzyl and Y is hydrogen, alkyl having 1 to 6 carbon atoms, halomethyl wherein halo is chlorine, bromine or iodine, phenyl, chlorophenyl, methylphenyl, naphthyl, chloronaphthyl, methylnaphthyl, biphenyl, chlorobiphenyl, methylbiphenyl, benzyl, chlorobenzyl or methylbenzyl and (c) aluminum trialkyl, aluminum halogen alkyl or aluminum alkoxyalkyl, the molar ratio of a:b:c being 1:0.3 to 10:0.8 to 15.

8. The catalyst of claim 7 wherein (a) is tungsten hexachloride.

9. The catalyst of claim 7 wherein X and Y are hydrogen or alkyl having 1 to 6 carbon atoms.

10. The catalyst of claim 7 wherein (c) is aluminum trialkyl.

(References on following page)

| Example number | Co-catalyst | Mmol | Aluminium compound | Mmol | Yield, percent | (η) | I.R. trans content, percent |
|---|---|---|---|---|---|---|---|
| 28 | Epibromohydrin | 0.75 | Al(i-C$_4$H$_9$)$_3$ | 1.25 | 73 | 1.97 | 95.3 |
| 29 | do | 1.25 | Same | 1.30 | 77 | 1.47 | 91.4 |
| 30 | Styrene oxide | 0.75 | do | 1.50 | 75 | 1.65 | |
| 31 | do | 1.25 | do | 1.50 | 85 | 1.24 | 90.7 |
| 32 | 1-butylene oxide | 1.25 | do | 1.50 | 78 | 1.58 | 91.5 |
| 33 | Epichlorohydrin | 1.0 | Al(C$_2$H$_5$)Cl | 1.50 | 68 | 1.15 | |
| 34 | 1-butylene oxide | 1.0 | Al(i-C$_4$H$_9$)$_3$ | 1.50 | 70 | 1.71 | 92.0 |

References Cited

UNITED STATES PATENTS

| | | | |
|---|---|---|---|
| 3,129,208 | 4/1964 | Jezl et al. | 260—93.7 |
| 3,476,728 | 11/1969 | Natta et al. | 260—93.1 |
| 3,449,310 | 6/1969 | Dall' Asta et al. | 260—93.1 |
| 3,476,730 | 11/1969 | Streek et al. | 260—93.1 |

JOSEPH L. SCHOFER, Primary Examiner

R. A. GAITHER, Assistant Examiner

U.S. Cl. X.R.

252—431